US 12,501,284 B2

(12) United States Patent
Zhang et al.

(10) Patent No.: US 12,501,284 B2
(45) Date of Patent: Dec. 16, 2025

(54) MINING CONVERGED COMMUNICATION SYSTEM AND COMMUNICATION METHOD

(71) Applicant: CCTEG CHINA COAL RESEARCH INSTITUTE, Beijing (CN)

(72) Inventors: Liya Zhang, Beijing (CN); Chenxin Li, Beijing (CN); Liang Wen, Beijing (CN); Kebing Wang, Beijing (CN); Qingyong Meng, Beijing (CN); Wenzhen Wu, Beijing (CN); Yuan Fu, Beijing (CN); Yingxi Li, Beijing (CN); Guowei Yang, Beijing (CN); Chunxian Wei, Beijing (CN); Biao Li, Beijing (CN); Wanbo Dai, Beijing (CN); Dashan Yang, Beijing (CN); Zefang Li, Beijing (CN); Xiaodi Jia, Beijing (CN)

(73) Assignee: CCTEG China Coal Research Institute, Beijing (CN)

( * ) Notice: Subject to any disclaimer, the term of this patent is extended or adjusted under 35 U.S.C. 154(b) by 321 days.

(21) Appl. No.: 18/259,128

(22) PCT Filed: Feb. 7, 2023

(86) PCT No.: PCT/CN2023/074788
§ 371 (c)(1),
(2) Date: Jun. 23, 2023

(87) PCT Pub. No.: WO2024/001195
PCT Pub. Date: Jan. 4, 2024

(65) Prior Publication Data
US 2024/0397345 A1 Nov. 28, 2024

(30) Foreign Application Priority Data
Jun. 29, 2022 (CN) .................. 202210751843.X

(51) Int. Cl.
*H04W 24/02* (2009.01)
*H04W 4/021* (2018.01)
(Continued)

(52) U.S. Cl.
CPC ........... *H04W 24/02* (2013.01); *H04W 4/021* (2013.01); *H04W 4/16* (2013.01); *H04W 4/30* (2018.02)

(58) Field of Classification Search
CPC ....... H04W 24/02; H04W 4/021; H04W 4/16; H04W 4/30; H04W 12/08
See application file for complete search history.

(56) References Cited

U.S. PATENT DOCUMENTS

2018/0220301 A1* 8/2018 Gallagher ............. H04W 4/021
2020/0259896 A1* 8/2020 Sachs ..................... H04L 67/12

FOREIGN PATENT DOCUMENTS

| CN | 105471820 A | 4/2016 |
|---|---|---|
| CN | 110806717 A | 2/2020 |

(Continued)

OTHER PUBLICATIONS

OA for CN application 202210751843.X.
English translation of OA for CN application 202210751843.X.

*Primary Examiner* — Charles C Jiang
(74) *Attorney, Agent, or Firm* — Maginot, Moore & Beck, LLP

(57) ABSTRACT

The disclosure presents a mining converged communication system. The system includes a first converged communication device and a plurality of service devices. The first converged communication device is configured to receive a first data packet from a first service device that initiates a service request in the plurality of service devices, determine a first target service device that receives the service request in the plurality of service devices, based on the first data packet, and send the first data packet to the first target (Continued)

service device. The first service device in the plurality of service devices includes any service device set on or under a mine, and the first target service device includes at least one service device set on and/or under the mine.

19 Claims, 4 Drawing Sheets

(51) Int. Cl.
    *H04W 4/16*     (2009.01)
    *H04W 4/30*     (2018.01)

(56) References Cited

FOREIGN PATENT DOCUMENTS

| | | | | | |
|---|---|---|---|---|---|
| CN | 13114695 | A | | 7/2021 | |
| CN | 113114695 | A | * | 7/2021 | .......... H04L 65/1104 |
| CN | 214475513 | U | * | 10/2021 | |
| CN | 114374709 | A | * | 4/2022 | ............. H04L 67/12 |
| CN | 115150855 | A | | 10/2022 | |
| WO | WO-2018124953 | A1 | * | 7/2018 | ............ H04W 72/23 |

* cited by examiner

MINING CONVERGED COMMUNICATION SYSTEM AND COMMUNICATION METHOD

CROSS REFERENCE TO RELATED APPLICATION

This application is a U.S. national phase of International Application No. PCT/CN2023/074788, filed on Feb. 7, 2023, which is based upon and claims priority to Chinese patent application No. 202210751843.X filed on Jun. 29, 2022, the entire content of which is incorporated herein by reference.

TECHNICAL FIELD

The disclosure relates to the field of communication technologies, in particular to a mining converged communication system and a communication method.

BACKGROUND

People's daily work and life highly depend on underground resources, and thus the underground resource mining work is very important. During the operation process of the mining work, there are requirements for communication among devices under the mine, communication between devices under the mine and devices on the mine, and communication between devices under the mine and public network mobile terminals.

In the related art, it is impossible to meet information interaction requirements among the devices under the mine and between the devices under the mine and the public network mobile terminals.

SUMMARY

A first aspect of the disclosure provides a mining converged communication system. The system includes a first converged communication device and a plurality of service devices. The first converged communication device is configured to receive a first data packet from a first service device that initiates a service request in the plurality of service devices, determine a first target service device that receives the service request in the plurality of service devices, based on the first data packet, and send the first data packet to the first target service device. The first service device in the plurality of service devices includes any service device set on or under a mine, and the first target service device includes at least one service device set on and/or under the mine.

A second aspect of the disclosure provides a communication method, applicable to the mine converged communication system of the first aspect of the disclosure. The method includes: receiving a first data packet from a first service device that initiates a service request in a plurality of service devices; determining a first target service device that receives the service request in the plurality of service devices, based on the first data packet, and sending the first data packet to the first target service device; in which the first service device in the plurality of service devices includes any service device set on or under a mine, and the first target service device includes at least one service device set on and/or under the mine.

A third aspect of the disclosure provides an electronic device. The electronic device includes a processor and a memory for storing instructions executable by the processor. The processor is configured to execute the instructions to implement the communication method of the second aspect of the disclosure.

BRIEF DESCRIPTION OF THE DRAWINGS

The accompanying drawings herein are incorporated into and constitute part of the specification to illustrate embodiments consistent with the disclosure, and are used in combination with the specification to explain the principles of the disclosure and do not constitute an undue limitation of the disclosure.

DETAILED DESCRIPTION

In order to enable those skilled in the art to better understand technical solutions of the disclosure, technical solutions in embodiments of the disclosure will be clearly and completely described below in combination with the accompanying drawings. The same or similar numbers represent the same or similar components or components having the same or similar functions. The embodiments described below with reference to the accompanying drawings are exemplary and are intended to be used to explain the disclosure, which may not be understood as limiting the disclosure.

Figure 1:
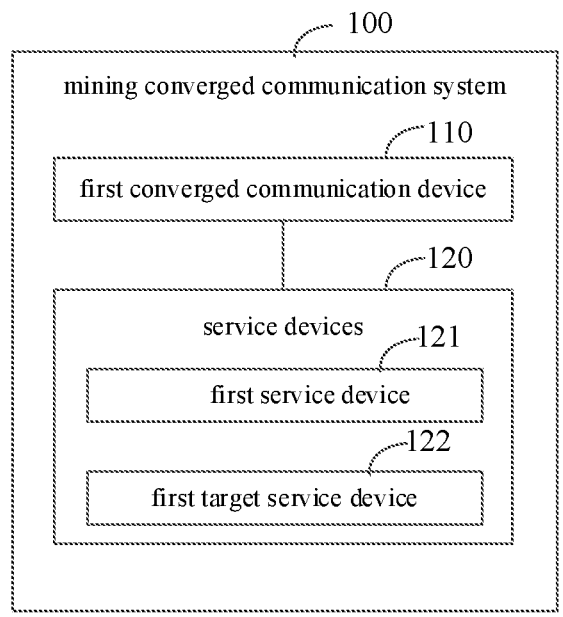
FIG. 1 is a schematic diagram of a mining converged communication system according to an embodiment of the disclosure.

FIG. 1 is a schematic diagram of a mining converged communication system according to an embodiment of the disclosure. As shown in FIG. 1, the mining converged communication system 100 includes a first converged communication device 110 and a plurality of service devices 120.

The first converged communication device 110 is configured to receive a first data packet from a first service device 121 that initiates a service request in the plurality of service devices 120, determine a first target service device 122 that receives the service request in the plurality of service devices 120, based on the first data packet, and send the first data packet to the first target service device 122.

The first service device 121 in the plurality of service devices 120 includes any service device set on or under a mine, and the first target service device 122 includes at least one service device set on and/or under the mine.

In practice, a converged communication platform is provided in an operation area on the mine. The first converged communication device 110 is arranged in the converged communication platform provided in the operation area on the mine, to realize information interaction between each service device in the plurality of service devices 120.

The plurality of service devices 120 may include aboveground service devices on the mine and may also include mine service devices under the mine.

In the mine service devices or the aboveground service devices, a service device that needs to initiate the service request is determined as the first service device 121, and a data packet corresponding to the service request initiated by the first service device 121 is determined as the first data packet.

In some implementations, the mine service devices and aboveground service devices of the plurality of service devices 120 are connected with the first converged communication device 110 in a wired and/or wireless manner, to establish corresponding communication links. Through the communication links among the mine service devices and aboveground service devices of the plurality of service devices 120 and the first converged communication device 110, the first service device 121 may send the first data packet corresponding to the service request to be initiated to the first converged communication device 110.

The first converged communication device 110 reads the information from the first data packet, determines the first target service device 122 that receives the service request from the remaining service devices other than the first service device 121 in the plurality of service devices 120, and send the first data packet to the first target service device 122 through the communication links among the mine service devices and aboveground service devices of the plurality of service devices 120 and the first converged communication device 110.

It is noted that the first service device 121 may include any service device in the mine service devices or the aboveground service devices, and the first target service device 122 may include at least one service device in the mine service devices and/or the aboveground service devices.

It is understood that any service device in the mine service devices or the aboveground service devices, as the first service device that initiates the service request, can send the first data packet corresponding to the service request to be sent to the plurality of service devices included in the mining converged communication system. The first target service device that partially receives the first data packet may include at least one service device in the mine service devices, or at least one service device in the aboveground service devices, or the plurality of service devices in both the mine service devices and in the aboveground service devices.

The mining converged communication system provided in the disclosure includes the first converged communication device and the plurality of service devices. The first converged communication device can receive the first data packet from the first service device that initiates the service request in the plurality of service devices, determine the first target service device that receives the service request in the plurality of service devices, based on the first data packet, and send the first data packet to the first target service device. In the disclosure, the information interaction between the aboveground service devices on the mine and the mine service devices under the mine included in the plurality of service devices is realized through the first converged communication device, which breaks the system isolation between the mine service devices and the aboveground service devices in the plurality of service devices due to different service types, and the phenomenon of data non-interoperability among different systems, realizes data interoperability and function cooperation among different service devices, and optimizes the communication method between the mine service devices and the aboveground service devices.

Figure 2:
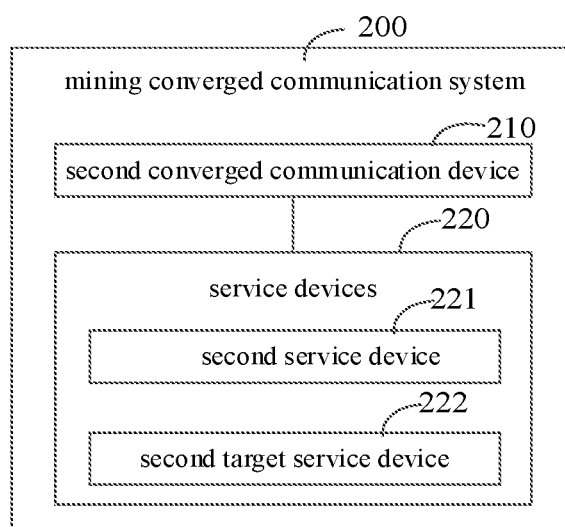
FIG. 2 is a schematic diagram of a mining converged communication system according to an embodiment of the disclosure.

The mining converged communication system proposed in the disclosure further includes a second converged communication device, which may be further understood in combination with FIG. 2. FIG. 2 is a schematic diagram of a mining converged communication system according to another embodiment of the disclosure. As shown in FIG. 2, the mining converged communication system 200 includes a second converged communication device 210 and a plurality of service devices 220.

The second converged communication device 210 is configured to receive a second data packet from a second service device 221 of an initiator of the service request in the plurality of service devices 220, determine a second target service device 222 that receives the service request in the plurality of service devices 220, based on the second data packet, and send the second data packet to the second target service device 222.

The second service device includes any service device set under the mine, and the second target service device 222 includes at least one service device set under the mine.

In the embodiment of the disclosure, the mining converged communication system 200 includes the second converged communication device 210 set under the mine. The second converged communication device 210 may receive the second data packet from the second service device 221 that initiates the service request in the plurality of service devices 210, and determine the service device that receives the second data packet as the second target service device 222 from the remaining service devices other than the second service device 221 in the plurality of service devices 210, and send the second data packet to the second target service device 222.

In this scenario, the plurality of service devices 210 are service devices set under the mine. The second service device 221 is any service device set under the mine in the plurality of service devices 210, and the second target service device 222 is at least one service device set under the mine in the remaining service devices other than the second service device 221 in the plurality of service devices 210.

It is understood that any of the mine service devices, as the second service device that initiates the service request, may send the second data packet corresponding to the service request to be sent to the plurality of service devices included in the mining converged communication system. The second target service device that partially receives the second data packet may include at least one service device of the mine service devices.

The mining converged communication system provided in the disclosure includes the second converged communication device and the plurality of service devices. The second converged communication device may receive the second data packet from the second service device that initiates the service request in the plurality of service devices, determine the second target service device that receives the service request in the plurality of service devices, based on the second data packet, and send the second data packet to the second target service device. In the disclosure, the information interaction between the plurality of service devices set under the mine is achieved through the second converged communication device, which breaks the system isolation among the mine service devices in the plurality of service devices due to different service types, and the phenomenon of data non-interoperability among different systems, realizes data interoperability and function cooperation among different service devices, and optimizes the communication method among the mine service devices.

Figure 3:
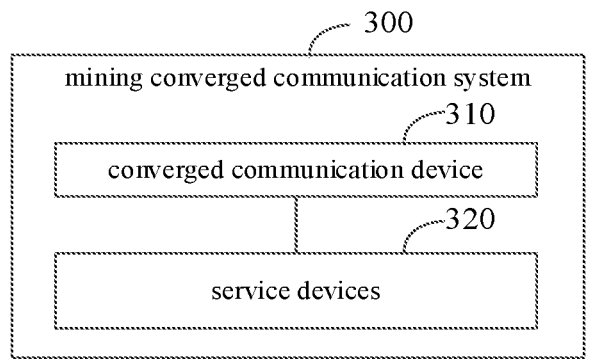
FIG. 3 is a schematic diagram of a mining converged communication system according to an embodiment of the disclosure.

The above embodiments can be better understood in combination with FIG. 3. FIG. 3 is a schematic diagram of a mining converged communication system according to another embodiment of the disclosure. As shown in FIG. 3, the mining converged communication system 300 includes a converged communication device 310 and a plurality of service devices 320.

The converged communication device is further configured to read a target service node identifier corresponding to a recipient of the service request in the plurality of service devices from the first data packet and/or the second data packet, and determine the target service device indicated by the target service node identifier based on a preconfigured list of node identifiers.

In the embodiment of the disclosure, the converged communication device 310 is at least one of a converged communication device set on the mine or a converged communication device set under the mine. The converged communication device 310 may read information from the first data packet and/or the second data packet, and determine the service device that receive the first data packet and/or the second data packet in the plurality of service devices 320 from the information.

It is noted that at least one service device of the plurality of service devices in the mining converged communication system includes: at least one of a LTE communication device, a 5G NR communication device, a WI-FI communication device, a positioning device, a broadcasting device, a GIS device, a scheduling device, a video monitoring device, a security monitoring device, and a 6G communication device.

In practice, the converged communication device 310 configures identification information for each of the plurality of service devices and determines a node identifier corresponding to each service device based on the respective identification information. The node identifier corresponding to each service device in the plurality of service devices can be integrated, to obtain a list of node identifiers corresponding to each service device in the plurality of service devices 320 in the mining converged communication system 300.

The indication relation between each service device and its corresponding node identifier in the list of node identifiers is obtained, to determine the service devices corresponding to different node identifiers.

Therefore, the service device of the recipient is determined based on the service node identifier corresponding to the recipient in the plurality of service devices and carried by the first data packet and/or the second data packet. The service node identifier corresponding to the recipient of the first data packet and/or the second data packet may be determined as the target service node identifier of the first data packet and/or the second data packet. The service device indicated by the target service node identifier is determined from the list of node identifiers as the target service device of the recipient of the first data packet and/or the second data packet.

In some embodiments, the converged communication device may read the node identifier corresponding to the service device of the initiator of the first data packet and/or the second data packet and the target service node identifier corresponding to the service device of the recipient of the first data packet and/or the second data packet from at least one of the data packet header of the first data packet and/or the second data packet, the physical layer signaling, and the MAC layer. The node identifier corresponding to the service device of the initiator and the target service node identifier of the service device of the recipient may be filled in by the initiator of the service request in the first data packet and/or the second data packet in at least one of the data packet header, the physical layer signaling, and the MAC layer signaling.

The first data packet and/or the second data packet are sent to the corresponding target service device indicated by the target service node identifier.

It is understood that after determining the target service device indicated by the target service node identifier, the converged communication device sends the first data packet and/or the second data packet to the target service device through the communication link with the target service device.

In the embodiment of the disclosure, the target service node identifier includes one of: a single identifier, a cluster identifier, a service identifier, a region identifier, or a collective identifier.

In some embodiments, if the target service node identifier is the single identifier, it can be determined that the target service device is one of the plurality of service devices. In response to the target service node identifier including an identifier corresponding to a service device, the target service node identifier is the single identifier, the first data packet from the first service device and/or the second data packet from the second service device is sent to a single service device indicated by the single identifier.

The first data packet from the first service device and/or the second data packet from the second service device may be sent to the single service device indicated by the single identifier.

In some embodiments, when the target service node identifier is the cluster identifier, the target service node identifier may include the corresponding identifiers of the plurality of service devices or include the pre-configured cluster node identifier.

In a scenario where the target service node includes the pre-configured cluster node identifier, in response to the target service node identifier including an identifier corresponding to a preset cluster, the target service node identifier is determined as the cluster identifier, the first data packet from the first service device and/or the second data packet from the second service device is sent to all service devices within a cluster indicated by the preset cluster identifier.

In practice, the plurality of service devices has a preset cluster architecture, which can be used to assign the service devices with the same service into the cluster, and preset the node identifier for the cluster. When the target service node identifier indicated in the first data packet from the first service device and/or the second data packet from the second service device is the preset cluster identifier, the first data packet from the first service device and/or the second data packet from the second service device is sent to all service devices within the cluster indicated by the preset cluster identifier.

In the scenario where the target service node identifier includes the corresponding identifiers of the plurality of service devices, in response to the target service node identifier including the corresponding identifiers of the plurality of service devices, the corresponding cluster node identifier is generated based on the corresponding identifiers of the plurality of service devices, the target service node identifier is determined as the cluster identifier, and the first data packet from the first service device and/or the second data packet from the second service device is sent to all service devices within the cluster indicated by the cluster identifier.

In this scenario, the corresponding identifiers of the plurality of service devices do not belong to the pre-configured cluster node identifier, and thus the corresponding identifiers of the plurality of service devices can be used for generating the cluster node identifier, to generate the corresponding new cluster node identifier.

The first data packet from the first service device and/or the second data packet from the second service device is sent to all service devices within the cluster indicated by the cluster node identifier.

It is noted that this generated cluster node identifier can be stored in the preset cluster identifier, and when data transfer is required with all service devices within the cluster indicated by this generated cluster node identifier, the service device of the initiator of the service request may write the generated cluster node identifier in at least one of the data packet header of the corresponding data packet, the physical layer signaling, and the MAC layer.

In some embodiments, when the target service node identifier is the service identifier, in response to the target service node identifier including an identifier corresponding to a service, the target service node identifier is determined as the service identifier, the first data packet from the first service device and/or the second data packet from the second service device is sent to all service devices for providing the service corresponding to the service identifier.

In practice, the service functions supported by the plurality of service devices included in the mining converged communication system are different. For a certain service function, only part of the service devices may support and be enabled. For example, for a video monitoring service, only part of the service devices configured with an image acquisition device can carry out video monitoring. For example, for a positioning service, only part of the service devices configured with a positioning system can carry out positioning.

Therefore, when the first service device and/or the second service device transfers the first service device and/or the second service device for service devices having the required service type, the first service device and/or the second service device may write the service identifier at a writing location of the target service node in the first data packet and/or the second data packet.

After the converged communication device reads the service identifier, it can determine the service devices that provides the service corresponding to the service identifier in the plurality of service devices based on the service identifier, and send the first data packet from the first service device and/or the second data packet from the second service device to all service devices that provide the corresponding service.

In some embodiments, when the target service node identifier is the region identifier, in response to the target service node identifier including an identifier corresponding to an operation region under the mine, the target service node identifier is determined as the region identifier, the first data packet from the first service device and/or the second data packet from the second service device is sent to all service devices in the operation region under the mine corresponding to the region identifier.

In practice, there can be multiple operation regions on the mine and under the mine, and there are corresponding service devices in each operation region, so it is possible to initiate a service request only for service devices in a certain operation region.

In this scenario, the first service device and/or the second service device can write the corresponding region identifier at the writing location of the target service node in the first data packet and/or the second data packet. After the converged communication device reads the region identifier, it can determine the service devices in the corresponding region in the plurality of service devices according to the region identifier, and send the first data packet from the first service device and/or the second data packet from the second service device to all service devices in the corresponding region.

In some embodiments, when the target service node identifier is the collective identifier, in response to the target service node identifier including identifiers corresponding to all service devices of the plurality of service devices, the service node identifier is determined as the collective identifier, the first data packet from the first service device and/or the second data packet from the second service device is sent to all service devices of the plurality of service devices.

In practice, when data transfer is required with all service devices on the mine and under the mine, and in this scenario, the service device of the initiator of the service request, can write the collective identifier at the location for writing the target service node identifier in the corresponding data packet. After the converged communication device reads the first data packet from the first service device and/or the second data packet from the second service device and determines that the node identifier corresponding to the transmission object of the first data packet and/or the second data packet is the collective identifier, the first data packet from the first service device and/or the second data packet from the second service device is sent to all service devices in the mining converged communication system.

The mining converged communication system provided in the disclosure includes the converged communication device and the plurality of service devices. The converged communication device can read the target service node identifier in the data packet sent by the service device, and send the received data packet to the target service device indicated by the target service node identifier. In this disclosure, the information interaction among the plurality of service devices is realized by the converged communication device, which breaks the phenomenon of system isolation among the plurality of service devices due to different service types, and the phenomenon of data non-interoperability among different systems, realizes data interoperability and function cooperation among different service devices, and optimizes the communication method among the mine service devices.

Figure 4:
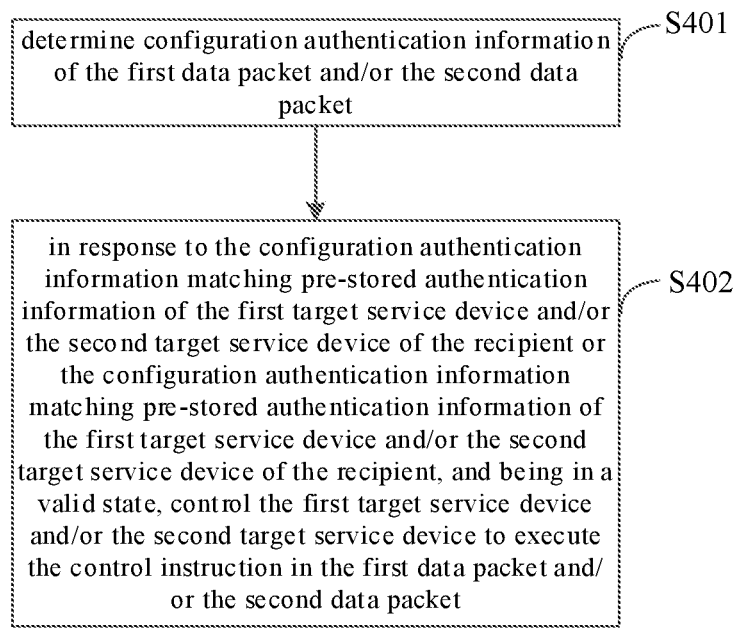
FIG. 4 is a flowchart of a service device authentication method according to an embodiment of the disclosure.

In practice, a control instruction may be preset in the data packet, which can be further understood in combination with FIG. 4. FIG. 4 is a flowchart of a service device authentication method of an embodiment of the disclosure. As shown in FIG. 4, the method includes S401 and S402.

At step S401, configuration authentication information of the first data packet and/or the second data packet is determined.

In the embodiment of the disclosure, the first data packet and/or the second data packet may include the preset control instruction, and the control instruction is used to implement function cooperation and scheduling of the converged communication device.

In some embodiments, an indication field and a reserved field are included in the data packet header of the first data packet and/or the second data packet, and it can be determined whether the first data packet and/or the second data packet carries the control instruction of the converged communication device based on the indication field and/or the reserved field in the data packet header of the first data packet and/or the second data packet.

In order to maintain secure and efficient operation of the system, the first data packet and/or the second data packet carrying the control instruction need to be authenticated.

In some embodiments, the configuration authentication information can be set for the first data packet and/or the second data packet. The configuration authentication information may be a code or other unique data, which is not limited herein.

At step S402, in response to the configuration authentication information matching pre-stored authentication information of the first target service device and/or the second target service device of the recipient, or the configuration authentication information matching pre-stored authentication information of the first target service device and/or the second target service device of the recipient, and being in a valid state, the first target service device and/or the second target service device is controlled to execute the control instruction in the first data packet and/or the second data packet.

In the embodiment of the disclosure, the first target service device and/or the second target service device that receives the first data packet and/or the second data packet has the pre-stored authentication information that can match the configuration authentication information carried in the first data packet and/or the second data packet.

After the first target service device and/or the second target service device receives the first data packet and/or the second data packet, the first target service device and/or the second target service device may read the configuration authentication information carried therein and compare it with the pre-stored authentication information. If the configuration authentication information matches the pre-stored authentication information, it is determined that first target service device and/or the second target service device receives the control instruction carried in the first data packet and/or the second data packet, and the control instruction may be executed by the first target service device and/or the second target service device.

For example, it can be set that service device B can only execute the control instruction initiated by service device A, when the service device A initiates the data packet carrying the control instruction, it can write the set configuration authentication information for the data packet. After the service device B receives the data packet and compares the configuration authentication information with the pre-stored matching information, and if the configuration authentication information matches with the pre-stored matching information, the service device B can determine that the control instruction in the data packet is sent by the service device A, and then it can perform the relevant execution operation on the control instruction.

It should be noted that each of the configuration authentication information and the pre-stored authentication information belongs to a list of authentication information. The list of authentication information needs to be updated through the converged communication device, to realize the secure operation of the system.

In some embodiments, the list of information to which the configuration authentication information corresponding to the control instruction and the list of information to which the pre-stored authentication information belongs can be updated at a first time interval.

The authentication information of the lists of authentication information to which the configuration authentication information and the pre-stored authentication information belong can be updated at the preset first time interval. It is understood that a matching relation between the configuration authentication information and the pre-stored authentication information needs to be updated at the same time as the configuration authentication information and the pre-stored authentication information in the list are updated at the first time interval.

In some embodiments, a mapping relation between the configuration authentication information corresponding to the control instruction and the service device of the initiator of the control instruction may be updated at a second time interval. The service device of the initiator corresponding to the configuration authentication information is determined based on the updated mapping relation, and the configuration authentication information is sent to the service device of the corresponding initiator.

It is understood that the mapping relation between the configuration authentication information written in the data packet and the service device that initiates the control instruction is updated at the set second time interval, and the updated mapping relation is sent to the service device of the recipient corresponding to the control instruction.

For example, the service device A can be set as the service device that sends control instruction 1, the service device B can be set as the service device that receives and executes the control instruction 1 sent by the service device A, and there is a mapping relation between configuration authentication information X and the service device A.

In this scenario, the mapping relation between the configuration authentication information X and the service device A can be updated at the second time interval, and the configuration authentication information in the mapping relation with the service device A after the updating can be set to be configuration authentication information X1, and then the mapping relation between the service device A and the configuration authentication information X1 can be sent to the service device B.

At this time, the configuration authentication information X1 is the configuration authentication information that matches the pre-stored authentication information in the service device B.

In some embodiments, the mapping relation between the pre-stored authentication information corresponding to the control instruction and the service device of the recipient of the control instruction may be updated at the second time interval, the service device of the recipient corresponding to the pre-stored authentication information is determined based on the updated mapping relation, and the pre-stored authentication information is sent to the corresponding service device of the recipient.

It is understood that the mapping relation between the pre-stored authentication information and the service device that receives the control instruction is updated at the set second time interval, and the updated mapping relation is sent to the service device that initiates the control instruction.

For example, the service device A is set as the service device that sends the control instruction 1, the service device B is the service device that receives and executes the control instruction 1 sent by the service device A, and there is a mapping relation between pre-stored authentication information Y and the service device B.

In this scenario, the mapping relation between the pre-stored authentication information Y and the service device B can be updated at the second time interval, and the pre-stored authentication information in the mapping relation with the service device B after the updating can be set as pre-stored authentication information Y1. The mapping relation between the service device B and the pre-stored authentication information Y can be sent to the service device A.

At this time, the pre-stored authentication information Y1 is the pre-stored authentication information that matches the configuration authentication information written by the service device A for the data packet of the control instruction 1.

In the mining converged communication system proposed in the disclosure, the service device that initiates the control instruction in the plurality of service devices can configure corresponding configuration authentication information for the data packet corresponding to the control instruction. After the service device corresponding to the recipient reads the configuration authentication information in the data packet, it determines whether the received control instruction is an executable control instruction based on the matching relation between the pre-stored authentication information and the configuration authentication information. In the disclosure, transfer of data packet carrying the control instruction among the plurality of service devices is implemented by the converged communication device, function cooperation among the plurality of service devices is realized, and through the configuration authentication information in the data packet and the pre-stored authentication information of the service device that receives the data packet, the security of function cooperation among the service devices is improved.

Figure 5:
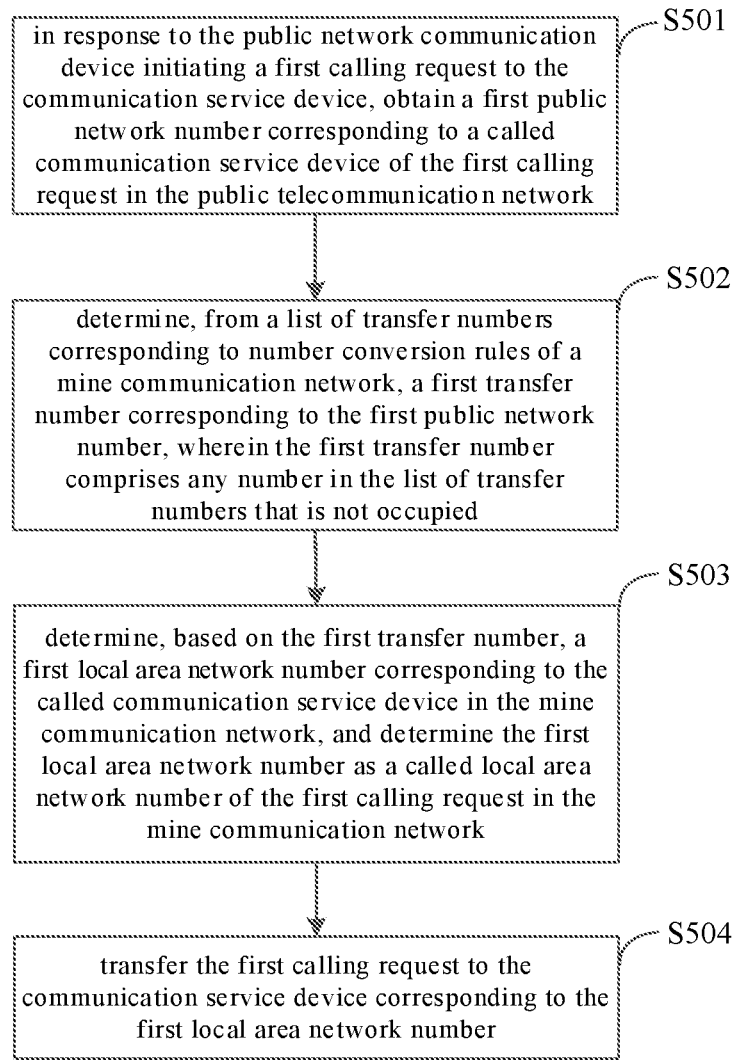
FIG. 5 is a flowchart of a calling method according to an embodiment of the disclosure.

The mining converged communication system proposed in the disclosure may also support audio and/or video calls among the plurality of service devices and support calls with a public network communication device in a public telecommunication network. The public network communication device initiates a calling request to the communication service device, which can be further understood in combination with FIG. 5. FIG. 5 is a flowchart of a calling method of an embodiment of the disclosure. As shown in FIG. 5, the method includes S501, S502, S503, and S504.

At step S501, in response to the public network communication device initiating a first calling request to the communication service device, a first public network number corresponding to a called communication service device of the first calling request in the public telecommunication network is obtained.

In practice, the plurality of service devices in the mining converged communication system also include the communication service device, such as a mobile terminal. The communication service device supports audio and/or video calls, and supports calls with the public network communication device in the public telecommunication network.

In some implementations, the call between the public network communication device and the communication service device in the mining converged communication system can be implemented through the converged communication device.

The calling request initiated by the public network communication device to the communication service device can be identified as the first calling request.

In this embodiment of the disclosure, the first calling request carries the corresponding public network number of the called communication service device in the public telecommunication network, and the corresponding public network number can be identified as the first public network number of the communication service device in the public telecommunication network.

At step S502, a first transfer number corresponding to the first public network number is determined from a list of transfer numbers corresponding to number conversion rules of a mine communication network, in which the first transfer number includes any number in the list of transfer numbers that is not occupied.

In the embodiment of the disclosure, the number systems of the mine communication network and the public telecommunication network are different, and the number conversion rules are set in the mine communication network, and the first public network number read from the first calling request can be converted to the corresponding number in the mine communication network according to the number conversion rules of the mine communication network, so as to realize the current calling with the communication service device in the mine communication network.

In some embodiments, the first public network number can be converted by the list of transfer numbers, and the first transfer number corresponding to the first public network number can be determined from the list of transfer numbers corresponding to the number conversion rules of the mine communication network, and one of the unoccupied transfer numbers can be randomly selected from the list of transfer numbers as the first transfer number of the first public network number.

At step S503, based on the first transfer number, a first local area network number corresponding to the called communication service device in the mine communication network is determined, and the first local area network number is determined as a called local area network number of the first calling request in the mine communication network.

In the embodiment of the disclosure, there is a set mapping relation between the transfer number and the number in the mine communication network. After determining the first transfer number, the corresponding local area network number of the first transfer number in the mine communication network can be obtained according to the set mapping relation and determined as the first local area network number of the first public network number in the mine communication network, and the called local area network number of the first calling request in the mine communication network can be determined.

At step S504, the first calling request is transferred to the communication service device corresponding to the first local area network number.

In the embodiment of the disclosure, the converged communication device has a set calling forward function. After determining the called local area network number in the mine communication network, the converged communication device can determine the called communication service device in the first calling request based on the called local area network number.

The first calling request is transferred to the communication service device indicated by the first local area network number.

It should be noted that the first calling request also includes a second public network number corresponding to a calling public network communication device in the public telecommunication network, and thus it is also necessary to convert the number system of the second public network number.

A second transfer number corresponding to the second public network number can be determined from the list of transfer numbers corresponding to the number conversion rules of the mine communication network, and the second transfer number is any number in the list of transfer numbers that is not occupied.

Correspondingly, part of the unoccupied transfer numbers can be obtained from the list of transfer numbers corresponding to the number conversion rules of the mine communication network, and a number can be randomly selected from the part of the unoccupied transfer numbers as the second transfer number corresponding to the second public network number.

A second local area network number of the calling public network communication device in the mine communication network is determined based on the second transfer number, and the second local area network number is used as the calling local area network number of the first calling request in the mine communication network.

According to the mapping relation between the transfer number and the local area network number in the mine communication network, the second transfer number is converted and integrated, to obtain the local area network number corresponding to the second transfer number in the mine communication network as the second local area network number of the second public network number in the mine communication network, which is determined as the calling local area network number of the first calling request in the mine communication network.

The address of the called communication service device can be searched in the mine communication network according to the calling local area network number and the called local area network number of the first calling request in the mine communication network, to transfer the first calling request to the communication service device corresponding to the called local area network number.

In some implementations, the number conversion rules of the mine communication network may be determined based on the number of digits in the number system of the public telecommunication network, and the number of digits in the number system of the mine communication network. The number conversion of the mine communication network may be further understood in combination with the following examples.

In some embodiments, in response to the public network communication device initiating the first calling request to the communication service device, a first number of digits for a public network number in a first number system of the public telecommunication network is obtained, and a second number of digits for a local area network number in a second number system of a mine communication network is obtained.

In the embodiment of the disclosure, the number system of the public telecommunication network is determined as the first number system, the number system of the mine communication network is determined as the second number system, the number of digits of the public network number in the first number system is determined as the first number of digits, and the number of digits of the local area network number in the second number system is determined as the second number of digits.

The conversion between the public network number in the first number system and the local area network number in the second number system is achieved by comparing the first number of digits and the second number of digits.

In some embodiments, the calling public network number and/or the called public network number of the first calling request in the first number system is converted to the calling local area network number and the called local area network number in the second number system according to the first number of digits and the second number of digits. The first number of digits of the public network number in the first number system of the public telecommunication network is different from the second number of digits of the local area network number in the second number system of the mine communication network.

As a possible implementation, when the first number of digits is less than the second number of digits, the calling public network number and/or the called public network number of the first number of digits in the first number system is filled in until the number of digits of the calling public network number and/or the called public network number after the filling in is the same as the second number of digits.

The second number of digits of the local area network number in the second number system in the mine telecommunication network may be greater than the first number of digits of the public network number in the first number system in the public telecommunication network. In this scenario, it is necessary to fill in the public network number in the first number system.

The calling public network number and the called public network number of the first number of digits in the first calling request are obtained and filled in respectively.

The transfer number corresponding to the calling public network number after filling in can be obtained, and the calling local area network number corresponding to the calling public network number after filling in in the mine communication network can be determined based on the corresponding transfer number.

Correspondingly, the transfer number corresponding to the called public network number after filling in can be obtained, and the called local area network number corresponding to the called public network number after filling in in the mine communication network can be determined based on the corresponding transfer number.

For example, the first number of digits of the public network number in the first number system is set as L, and the second number of digits of the local area network number in the second number system is set as M.

When L is less than M, a difference between L and M can be obtained. The calling public network number and/or the called public network number in the first number system can be filled in based on the difference. The number of digits of the calling public network number and/or the called public network number in the first number system can be filled in from L to M, so that the calling public network number and/or the called public network number is converted to the calling local area network number and/or the called local area network number in the mine communication network.

As another possible implementation, when the first number of digits is greater than the second number of digits, and the number capacity in the mine communication network is obtained, the second number of digits takes 10 as a base value and a value of the second number of digits as an exponent is greater than or equal to the number capacity in the mine communication network.

The second number of digits of the local area network number in the second number system in the mine telecommunication network may be less than the first number of digits of the public network number in the first number system in the public telecommunication network. In this scenario, the first number of digits of the public network number in the first number system needs to be calculated.

In some embodiments, the number capacity in the mine communication network can be obtained, the public network number of the first number of digits can be configured based on an association between the number capacity and the second number of digits, so as to obtain the transfer number corresponding to the first number.

The association between the number capacity and the second number of digits may be determined based on the second number of digits taking 10 as a base value and a value of the second number of digits as an exponent being greater than or equal to the number capacity in the mine communication network, and the public network number of the first number of digits is configured according to this set association.

The calling public network number and the called public network number of the first number of digits in the first calling request are obtained and configured respectively based on the set association.

The transfer number corresponding to the calling public network number in the first calling request is configured according to the number capacity, the transfer number is mapped, and the number obtained from the mapping is used as the calling local area network number of the first calling request in the mine communication network.

Correspondingly, the transfer number corresponding to the called public network number in the first calling request is configured according to the number capacity, the transfer number is mapped, and the number obtained from the mapping is used as the called local area network number of the first calling request in the mine communication network.

For example, if the number capacity in the mine communication network is set as X, the first number of digits of the public network number in the first number system is L, and the second number of digits of the local area network number in the second number system is M, since $10M \geq X$, the transfer number of the calling public network number and/or the called public network number in the first number system are configured respectively, and the number of digits of the calling public network number and/or the called public network number is filled in from L to M, to convert the calling public network number and/or the called public network number.

The numerical results calculated according to $10M \geq X$ can be ranked according to an ascending order or a descending order, and then the calling local area network number and/or the called local area network number in the mine communication network corresponding to the calling public network number and/or the called public network number in the first number system is determined from the ranked numerical results.

It should be noted that, in order to reduce the repetition probability of the public network number in the number system in the public telecommunication network and the local area network number in the number system of the mine communication network, in this embodiment of the disclosure, the first number of digits of the public network number in the number system of the public telecommunication network may be different from the second number of digits of the local area network number in the number system of the mine telecommunication network. Alternatively, the value range of the local area network number in the number system of mine telecommunication network is different from the value range of the public network number in the number system of the public telecommunication network, which is not limited herein.

It is understood that if the first number of digits of the public network number in the number system of the public telecommunication network is set as 11, the second number of digits of the local area network number in the number system of the mine telecommunication network can be other values, such as 10.

Alternatively, the value range of the first two digits of the public network number in the number system of the public telecommunication network is set as 13, the value range of the first two digits of the local area network number in the number system of the mine communication network can be 82.

In this embodiment of the disclosure, the transfer of the first calling request by the converged communication device may be failed, and it is determined that the first calling request is successfully transferred in response to the calling local area network number and/or the called local area network number obtained according to the number conversion rules of the mining communication network is the pre-configured numbers in the mining communication network.

If the calling public network number and/or the called public network number in the first calling request is converted to the calling local area network number and/or the called local area network number that is the pre-configured numbers in the mining communication network, it is understood that the calling local area network number and/or the called local area network number has been registered in the mine communication network and is a communication service device that is available for calls in the mine communication network. In this scenario, it can be judged that the transfer of the first calling request by the converged communication device is successful.

Correspondingly, in response to the calling local area network number and/or called local area network number obtained according to the number conversion rules of the mine communication network being not the pre-configured numbers in the mine communication network, the transfer of the first calling request is failed.

If the calling public network number and/or the called public network number in the first calling request is converted to the calling local area network number and/or the called local area network number that does not belong to the preconfigured numbers in the mine communication network, it is understood that the calling local area network number and/or the called local area network number has not been registered in the mine communication network, and the calling local area network number and/or the called local area network number in the mine communication network is the calling number. In this scenario, it can be judged that the transfer of the first calling request by the converged communication device is failed.

The mining converged communication system proposed in the disclosure can transfer a calling request initiated by the public network communication device in the public telecommunication network to the communication service device in the plurality of service devices. The local area network number of the public network number in the mine telecommunication network is obtained by performing the number system conversion on the public network number in the public telecommunication network. Finally, the calling request is transferred through the converged communication device. In this disclosure, the call between the public network communication device and the mine communication service device is realized by the converged communication device, and the communication method among the mine service devices is optimized.

The mining converged communication system proposed in the disclosure supports audio and/or video calls among the plurality of service devices and supports calls to the public network communication device in the public telecommunication network. The communication service device may also initiate a calling request to other communication service devices, which may be further understood in combination with the following examples.

In response to the communication service device as a calling communication service device initiating a second calling request to a called communication service device of other communication service devices in the mine communication network, a communication state of the called communication service device in the mine communication network is obtained.

In this embodiment of the disclosure, the communication service device in the mine communication network may initiate a calling request via the converged communication device to the remaining communication service devices other than the communication service device that initiates the calling request in the mine communication network, and the calling request in this scenario may be determined as the second calling request.

The communication state of the called communication service device in the second calling request in the mine communication network can be determined firstly, and then it is determined whether to transfer the second calling request to the called communication service device.

In some embodiments, if the communication state of the called communication service device in the mine communication network is online, the second calling request is transferred to the called communication service device.

In this scenario, it can be judged that the communication state of the called communication service device in the mine communication network is normal, the second calling request is transferred to the called communication service device.

In some embodiments, if the communication state of the called communication service device in the mine communication network is offline, it is judged whether the called communication service device is covered by the public telecommunication network.

In this scenario, it can be judged that there is a possibility of abnormality in the called communication service device.

It should be noted that the communication service device in the mine communication network can initiate and transfer the calling request through the relevant information such as address and port of the protocol server where the calling request is initiated and provided by the converged communication device, and the authentication information for the registration of the communication service device in the mine communication network may be provided. The communication service device can initiate registration on the converged communication device through the set multimedia subsystem server, digital voice gateway and other related devices, to realize successful registration in the mine communication network.

The successfully registered communication service device needs to update the communication state and user state information on the converged communication device, and send its own communication state information and user state information to the converged communication device at the preset time period.

As a possible implementation, the called communication service device may be outside of the coverage range of the mine communication network. In response to the called communication service device being covered by the public telecommunication network, the second calling request is transferred to the called communication service device covered by the public telecommunication network.

It can be determined whether the current called communication service device is covered by the public telecommunication network, and if the called communication service device is covered by the public telecommunication network, it can be judged that the called communication service has been registered in the public telecommunication network and can make calls with the called communication service device through the public telecommunication network.

In some embodiments, the called communication service device can be converted to a calling communication service device. In response to the called communication service device, acting as a calling communication service device, sending a third calling request to a called public network communication device in the public telecommunication network, a communication state and registration information of the called public network communication device in the mine communication network are obtained.

It is understood that the user using the called communication service device in this scenario is outside of the coverage range of the mine communication network, and in order to realize the transfer of the second calling request, the converged communication device can use the local area network number of the called communication service device as the calling local area network number, which is converted as the public network number in the public telecommunication network according to the number conversion rules of the mine communication network, and used as the calling number to make calls to other public network numbers registered by the same user in the public telecommunication network.

The calling request initiated by the called communication service device in the second calling request acting as the calling communication service device may be determined as the third calling request, and the public network communication device used by the public network number registered by the user in the third calling request in the public communication network may be determined as the called public network communication device.

In the implementation, the public network number registered by the user in the public communication network and the public network communication device used by the public network number needs to be registered in the converged communication device for registration information and communication state. Based on the registration information and the communication state of the current called public network device in the public communication network for the called user in the second calling request on the converged communication device, it is determined whether the currently initiated third calling request can be transferred successfully.

If the communication state and registration information are normal, the third calling request initiated by the called communication service device in the second calling request acting as the calling communication service device can be transferred to the called public network communication device used by the corresponding user, and the successful transfer of the second calling request is achieved by the successful transfer of the third calling request.

Correspondingly, if the acquisition of the communication state and the registration information are abnormal, in response to acquisition of the communication state being abnormal and the registration information being abnormal, the third calling request is invalidated.

In this scenario, it is determined that the state of the public network communication device registered in the public communication network of the user to be connected in the second calling request is abnormal, the third calling request cannot be successfully transferred and the third calling request needs to be invalidated.

Since the third calling request is invalidated, the transfer of the second calling request in this scenario is failed.

As another possible implementation, in response to the communication state of the called communication service device in the mine communication network being offline, and the called communication service device not being covered by the public telecommunication network, it is determined that calling of the second calling request initiated by the calling communication service device is failed.

In the implementation, it is possible that the state of the called communication service device in the mine communication network is offline, and the called communication service device is not covered by the public telecommunication network, in this scenario, the called communication service device may function abnormally, for example, the device may be turned off. In the above case, the converged communication service device cannot transfer the second calling request to the called communication service device, and thus it can be determined that the second calling request initiated by the calling communication service device is failed.

It should be noted that when the service device that initiates the calling request stops calling before the calling request is connected or hangs up after the calling request is connected, the service device that initiates the calling request or responds to the calling request can send a termination request to a protocol server for initiating the calling request of the converged communication device. The converged communication device can stop transferring messages based on the received termination request, and then stop calling to the called service device or disconnect the calling between the calling service device and the called service device.

The mining converged communication system proposed in the disclosure can transfer the calling request initiated by the communication service device in the mine communication network through the converged communication device, and then realize the calling among the communication service devices in the mine communication network. In this disclosure, the calling among the communication service devices in the mine communication network is realized through the converged communication device, and the communication method among the mine service devices is optimized.

Figure 6:
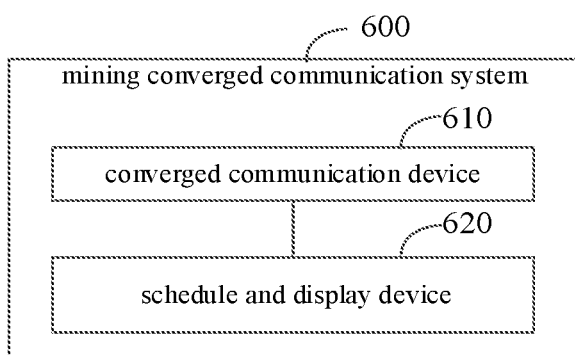
FIG. 6 is a schematic diagram of a mining converged communication system according to an embodiment of the disclosure.

In this embodiment of the disclosure, the mining converged communication system further includes a schedule and display device for displaying the location information and/or video monitoring screen of the relevant service device, sent by the converged communication device, which is further understood in combination with FIG. 6. FIG. 6 is a schematic diagram of a mining converged communication system according to an embodiment of the disclosure. As shown in FIG. 6, the mining converged communication system 600 includes a converged communication device 610 and a schedule and display device 620.

The converged communication device 610 is further configured to receive location information and/or monitoring screen information returned by a mine service device set under the mine in the plurality of service devices, and send the location information and/or monitoring screen information to the schedule and display device.

The schedule and display device 620 is configured to receive and display the location information and/or monitoring screen information, obtained and sent by the converged communication device.

In some implementations, the mine service device set under the mine needs to be positioned and monitored. The mine service device can send its own location information and monitoring screen information to the converged communication device 610, and the converged communication device 610 sends it to the schedule and display device 620 for displaying, and thus the mine service device can be positioned and monitored.

In the embodiment of this disclosure, since part of the mine service devices are unable to position themselves or do not have the function of video monitoring, a set monitoring service device can be configured in the mine service device, and through the set monitoring service device, the mine service device can be positioned and monitored.

In some embodiments, the monitoring service device set under the mine has a preset monitoring coverage range, and in response to the mine service device moving into the coverage range of the monitoring service device set under the mine in the plurality of service devices, the mine service device is associated to the monitoring service device.

It can be understood that when the mine service device set under the mine moves into the coverage range of the monitoring service device, the monitoring service device can identify the mine service device and obtain information about the mine service device that moves into its coverage range, and then actively establish an association relation between the mine service device and the monitoring service device.

The monitoring service device can send the current location information of the mine service device associated with it to the converged communication device. The converged communication device receives the location information of the mine service device sent by the monitoring service device and calls the monitoring screen of the mine service device captured by the monitoring service device.

The converged communication device can issue a scheduling instruction for the monitoring screen to the monitoring service device that uploads the location information, and then call the monitoring screen of the mine service device within its coverage range from the monitoring service device.

When the mine service device moves outside of the coverage range of the monitoring service device, in response to the mine service device moving outside of the coverage range of the monitoring service device, the association between the mine service device and the monitoring service device is disconnected.

The reception of the location information of the mine service device sent by the monitoring service device is stopped, and the calling of the monitoring screen of the mine service device captured by the monitoring service device is stopped.

In order to save the resource consumption of the monitoring service device, when the mine service device moves outside of the coverage range of the monitoring service device, the monitoring service device can disconnect the association with the mine service device and stop collecting the location information of the mine service device after disconnecting the association. Based on the severed relationship, the monitoring service device can stop collecting the location information of the mine service device and stop sending the location information of the mine service device to the converged communication device.

Correspondingly, when the converged communication device does not receive the location information of the mine service device from the monitoring service device, it can be judged that the current mine service device has moved outside of the coverage range of the monitoring service device, and then it can stop calling the monitoring screen of the mine service device captured on the monitoring service device.

In other implementations, an alarm area may exist in the operation area under the mine, and the mine service device that enters in the alarm area needs to be alerted and moved outside of the area under monitoring.

In some embodiments, in response to the mine service device moving into the alarm area, the location information from the mine service device within the alarm area is received.

In the embodiment of the disclosure, a corresponding mine service device is set in the alarm area, which is configured with a positioning function, a video monitoring function and an alarm function, so that when the mine service device moves into the alarm area, the mine service device in the alarm area can send the location information of the mine service device in the alarm area to the converged communication device.

When the converged communication device receives the location information sent by the mine service device in the alarm area, it can be determined that there is a mine mobile device that moves to the current alarm area from outside. In this scenario, the monitoring and surveillance of the alarm area can be activated, and the monitoring screen information of the alarm area obtained by monitoring and surveillance is sent to the schedule and display device.

By activating the monitoring function of the alarm area, video monitoring of the mine service device moving to the alarm area is realized, and the called monitoring screen information is sent to the schedule and display device.

The alarm information displayed on the schedule and display device is obtained, and the alarm information is sent to the mine service device in the alarm area until the mine service device moves outside of the alarm area, and then it stops monitoring the alarm area and stops sending the alarm information.

The relevant alarm information of the mine service device that moves to the alarm area can be displayed on the schedule and display device, and the converged communication device can obtain part of the alarm information from the schedule and display device and send it to the pre-configured mine service device in the alarm area, and an alert message is sent to the mine service device that moves to the alarm area based on the part of the alarm information.

When it is monitored that the mine service device that moves into the alarm area moves outside of the alarm area, the mine service device configured in the alarm area can stop uploading the location information. The converged communication device can determine that the mine service device that moves into the alarm area moves outside of the alarm area when the uploading of the location information is stopped. At this time, the converged communication device stops monitoring the alarm area and stops sending the alarm message.

It should be noted that in the plurality of service devices of the mining converged communication system, part of the service devices are not configured with a video monitoring function, and in order to realize video monitoring of the mine service device, in the embodiment of the disclosure, the converged communication device can obtain the indication information about the video monitoring function from the mine service device based on the received data packet, to determine whether the mine service device is configured with the video monitoring function.

In some embodiments, the first service device and/or the second service device has the video monitoring function, and when the first data packet and/or the second data packet is sent to the converged communication device, the indication information that the first service device and/or the second service device has the video monitoring function is carried, in response to the recipient of the first data packet and/or the second data packet being the schedule and display device, the converged communication device sends the first data packet and/or the second data packet to the schedule and display device. The converged communication device calls the monitoring screen and/or location information of the first service device and/or the second service device corresponding to a transmitter of the first data packet and/or the second data packet, and sends it to the schedule and display device for display. In response to the transmitter of the first data packet and/or the second data packet corresponding to the first service device and/or the second service device, the communication with the schedule and display device is stopped, and the calling of the monitoring screen and/or location information of the service device corresponding to the transmitter is stopped.

In some embodiments, the first data packet and the second data packet are sent to the converged communication device while transmitting video monitoring screen data of the first service device and/or the second service device of the initiator of the first data packet and the second data packet. In response to the recipient of the first data packet and/or the second data packet being the schedule and display device, the converged communication device sends the first data packet and/or the second data packet, and the video monitoring screen data of the first service device and/or the second service device of the initiator of the first data packet and the second data packet to the schedule and display device simultaneously. In response to the communication between the transmitter of the first data packet and/or the second data packet corresponding to the first service device and/or the second service device and the schedule and display device being ended, the transmitter stops sending the video surveillance screen data of the first service device and/or the second service device corresponding to the transmitter of the first data packet and/or the second data packet to the schedule and display device.

The mining converged communication system proposed in this disclosure includes a schedule and display device. The schedule and display device can receive the location information and the monitoring screen information of the mine service device sent by the converged communication device and display it. In the disclosure, the location information and the monitoring screen are displayed by the schedule and display device, which realizes the positioning and monitoring of the mine service device and improves the operation safety of the mine service device.

Figure 7:
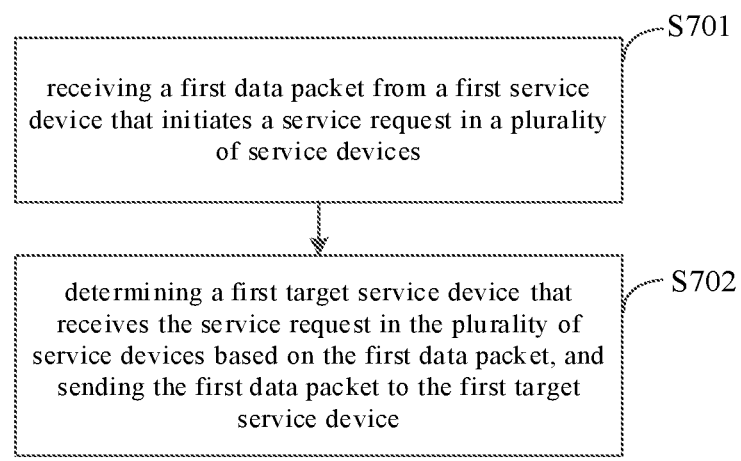
FIG. 7 is a flowchart of a communication method according to an embodiment of the disclosure.

To better understand the above embodiments, based on the mining converged communication system proposed in the above embodiments, the disclosure also provides a communication method shown in FIG. 7. FIG. 7 is a flowchart of a communication method of an embodiment of the disclosure. The method includes: S701 and S702.

At step S701, a first data packet is received from a first service device that initiates a service request in a plurality of service devices.

In the embodiment of the disclosure, the service device that initiates the service request in the plurality of service devices is determined as the first service device, and the data packet corresponding to the initiated service request may be determined as the first data packet.

Through the communication link between the first service device and the converged communication device, the first service device may send the first data packet carrying the service request to the converged communication device.

It is noted that the first service device can be any service device set on the mine or under the mine. It is understood that any service device set on the mine or under the mine can interact with the converged communication device. It can be understood that any service device set on the mine or under the mine can transfer data with the converged communication device.

At step S702, a first target service device that receives the service request in the plurality of service devices is determined based on the first data packet, and the first data packet is sent to the first target service device.

In this embodiment of the disclosure, the converged communication device may read the set information of the service device of the recipient of the first data packet from the received first data packet, and determine the service device that receives the first data packet according to the set indication information.

The service device of the recipient of the first data packet is determined as the first target service device. Through the communication link between the first target service device and the converged communication device, the converged communication device can transfer the first data packet send by the first service device to the first target service device.

It is noted that the first target service device is at least one service device set on the mine and/or under the mine. It is understood that the first target service device of the recipient of the first data packet may include at least one service device of the service devices set on the mine, or at least one service device of the service devices set under the mine, or at least one service device of the service devices set on the mine and set under the mine.

According to the communication method provided in the disclosure, the converged communication device may receive the first data packet sent by the first service device that initiates the service request in the plurality of service devices, determine the first target service device that receives the first data packet in the plurality of service devices based on the first data packet, and send the first data packet to the first target service device. In the disclosure, the information interaction between the service device on the mine and the mine service device included in the plurality of service devices is achieved through the converged communication device, which breaks the system isolation between the service device on the mine and the mine service device in the plurality of service devices due to different service types, and the phenomenon of data non-interoperability among different systems, realizes data interoperability and function cooperation among different service devices, and optimizes the communication method between the service device on the mine and the mine service device.

To achieve the above embodiments, the disclosure further provides an electronic device. The electronic device includes: a processor, and a memory for storing instructions executable by the processor. The processor is configured to execute the instructions to implement the communication method provided in the above embodiments.

To achieve the above embodiments, the disclosure also provides a computer readable storage medium.

The embodiments of the disclosure provide a computer readable storage medium having computer programs stored thereon. When the computer programs are executed by a processor, the communication method provided in the above embodiments is implemented.

The computer readable storage medium of the embodiment of the disclosure includes: the first converged communication device and the plurality of service devices. The first converged communication device can receive the first data packet from the first service device that initiates the service request in the plurality of service devices, determine the first target service device that receives the service request in the plurality of service devices based on the first data packet, and send the first data packet to the first target service device. In the disclosure, the information interaction between the service device on the mine and the mine service device included in the plurality of service devices is realized through the first converged communication device, which breaks the system isolation between the mine service device and the service device on the mine in the plurality of service devices due to different service types, and the phenomenon of data non-interoperability among different systems, realizes data interoperability and function cooperation among different service devices, and optimizes the communication method between the mine service device and the service device on the mine.

To achieve the above embodiments, the disclosure also provides a computer program product including computer programs. When the computer programs are executed by a processor, the communication method provided in the above embodiments is implemented.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise", "axial", "radial" and "circumference" refer to the directions and location relations which are the directions and location relations shown in the drawings, and for describing the disclosure and for describing in simple, and which are not intended to indicate or imply that the device or the elements are disposed to locate at the specific directions or are structured and performed in the specific directions, which could not to be understood to the limitation of the disclosure.

In addition, terms such as "first" and "second" are used herein for purposes of description and are not intended to indicate or imply relative importance or implicitly specify the number of technical features indicated. Furthermore, the feature defined as "first" or "second" may expressly or implicitly include one or more of those features. In the description of this disclosure, "a plurality of" means two or more, unless specified otherwise.

In the disclosure, unless specified or limited otherwise, the terms "mounted", "connected", "coupled" and "fixed" are understood broadly, such as fixed, detachable couplings or integrated, and can be mechanical or electrical couplings, and also can be direct and via media indirect couplings, and further can be inner couplings of two components or interaction relations between two components, which can be understood by those skilled in the art according to the detail embodiment of the disclosure.

In this disclosure, unless otherwise expressly specified and limited, a first feature "above" or "below" a second feature means that the first feature and the second feature are in direct contact, or the first feature and the second feature are in indirect contact through an intermediate medium. Moreover, the first feature is "above", "over" and "on top of" the second feature means that the first feature is directly above or diagonally above the second feature, or simply indicates that the first feature is horizontally higher above the second feature. The first feature is "below", "under", and "beneath" the second feature means that the first feature is directly below or diagonally below the second feature, or simply indicates that the horizontal height of the first feature is lower than the horizontal height of the second feature.

In the description of the disclosure, reference throughout this specification to "an embodiment", "some embodiments", "an example", "a specific example" or "some examples" means that a particular feature, structure, material, or characteristic described in connection with the embodiment or example is included in at least one embodiment or example of the disclosure. The appearances of the phrases in various places throughout this specification are not necessarily referring to the same embodiment or example of the disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

Although explanatory embodiments have been shown and described, it would be appreciated by those skilled in the art that the above embodiments cannot be construed to limit the disclosure, and changes, alternatives, and modifications can be made in the embodiments without departing from scope of the disclosure.

What is claimed is:

1. A mining converged communication system, comprising a first converged communication device and a plurality of service devices, wherein:
    the first converged communication device is configured to receive a first data packet from a first service device that initiates a service request in the plurality of service devices, determine a first target service device that receives the service request in the plurality of service devices, based on the first data packet, and send the first data packet to the first target service device;
    the first service device in the plurality of service devices comprises any service device set on or under a mine, and the first target service device comprises at least one service device set on and/or under the mine; and
    the plurality of service devices include a communication service device, the communication service device supports audio and/or video calls and supports calls with a public network communication device in a public telecommunication network, and the converged communication device is further configured to;
        in response to the public network communication device initiating a first calling request to the communication service device, obtain a first public network number corresponding to a called communication service device of the first calling request in the public telecommunication network;
        determine, from a list of transfer numbers corresponding to number conversion rules of a mine communication network, a first transfer number corresponding to the first public network number, wherein the first transfer number includes any number in the list of transfer numbers that is not occupied;
        determine, based on the first transfer number, a first local area network number corresponding to the called communication service device in the mine communication network, and determine the first local area network number as a called local area network number of the first calling request in the mine communication network; and
        transfer the first calling request to a communication service device corresponding to the first local area network number.

2. The system of claim 1, further comprising a second converged communication device, wherein:
    the second converged communication device is configured to receive a second data packet from a second service device of an initiator of the service request in the plurality of service devices, determine a second target service device that receives the service request in the plurality of service devices, based on the second data packet, and send the second data packet to the second target service device; and
    the second service device comprises any service device set under the mine, and the second target service device comprises at least one service device set under the mine.

3. The system of claim 2, wherein the converged communication device is further configured to:
    read a target service node identifier corresponding to a recipient of the service request in the plurality of service devices from the first data packet and/or the second data packet, and determine the target service device indicated by the target service node identifier based on a preconfigured list of node identifiers; and
    sent the first data packet and/or the second data packet to the target service device indicated by the corresponding target service node identifier; wherein:
    a service node identifier corresponding to the initiator of the service request and the target service node identifier corresponding to the recipient of the service request are filled in by the initiator of the service request in the first data packet and/or the second data packet in at least one of: a packet header, a physical layer signaling, and a multiple access channel (MAC) layer signaling.

4. The system of claim 3, wherein the target service node identifier comprises one of: a single identifier, a cluster identifier, a service identifier, a region identifier, or a collective identifier, wherein:
    in response to the target service node identifier comprising an identifier corresponding to a service device, the target service node identifier is the single identifier, the first data packet from the first service device and/or the second data packet from the second service device is sent to a single service device indicated by the single identifier; and/or
    in response to the target service node identifier comprising identifiers corresponding to multiple service devices, a corresponding cluster node identifier is generated based on the identifiers corresponding to the multiple service devices, and the target service node identifier is determined as the cluster identifier, the first data packet from the first service device and/or the second data packet from the second service device is sent to all service devices within a cluster indicated by the cluster identifier; and/or,
    in response to the target service node identifier comprising an identifier corresponding to a preset cluster, the target service node identifier is determined as the cluster identifier, the first data packet from the first service device and/or the second data packet from the second service device is sent to all service devices within a cluster indicated by the preset cluster identifier; and/or,
    in response to the target service node identifier comprising an identifier corresponding to a service, the target service node identifier is determined as the service identifier, the first data packet from the first service device and/or the second data packet from the second service device is sent to all service devices for providing the service corresponding to the service identifier; and/or, in response to the target service node identifier comprising an identifier corresponding to an operation region under the mine, the target service node identifier is determined as the region identifier, the first data packet from the first service device and/or the second data packet from the second service device is sent to all service devices in the operation region under the mine corresponding to the region identifier; and/or, in response to the target service node identifier comprising identifiers corresponding to all service devices of the plurality of service devices, the service node identifier is determined as the collective identifier, the first data packet from the first service device and/or the second data packet from the second service device is sent to all service devices of the plurality of service devices.

5. The system of claim 2, wherein the first data packet and/or the second data packet comprises a control instruction, and the converged communication device is further configured to:

determine configuration authentication information of the first data packet and/or the second data packet; and in response to the configuration authentication information matching pre-stored authentication information of the first target service device and/or the second target service device of the recipient, or the configuration authentication information matching pre-stored authentication information of the first target service device and/or the second target service device of the recipient, and being in a valid state, control the first target service device and/or the second target service device to execute the control instruction in the first data packet and/or the second data packet.

6. The system of claim 5, wherein the control instruction is configured to cause the converged communication device to implement functional linkage scheduling, and it is determined whether the first data packet and/or the second data packet carries the control instruction for the converged communication device based on an indication field and/or a reserved field in a packet header of the first data packet and/or the second data packet.

7. The system of claim 6, wherein the converged communication device is further configured to update a list of information to which the configuration authentication information corresponding to the control instruction belongs and a list of information to which the pre-stored authentication information belongs, at a first time interval.

8. The system of claim 7, wherein the converged communication device is further configured to:

update a mapping relation between the configuration authentication information corresponding to the control instruction and a service device of an initiator of the control instruction at a second time interval, determine the service device of the initiator corresponding to the configuration authentication information based on the updated mapping relation, and send the configuration authentication information to the service device of the initiator; and update a mapping relation between the pre-stored authentication information corresponding to the control instruction and a service device of a recipient of the control instruction at the second time interval, determine the service device of the recipient corresponding to the pre-stored authentication information based on the updated mapping relation, and send the pre-stored authentication information to the service device of the recipient.

9. The system of claim 1, wherein the first calling request further comprises a second public network number corresponding to a calling public communication device in the public telecommunication network, the converged communication device is further configured to:

determine a second transfer number corresponding to the second public network number from the list of transfer numbers corresponding to the number conversion rules of the mine communication network, wherein the second transfer number is any number in the list of transfer numbers that is not occupied; and determine a second local area network number of the calling public communication device in the mine communication network based on the second transfer number, and determine the second local area network number as a calling local area network number of the first calling request in the mine communication network.

10. The system of claim 1, wherein the plurality of service devices comprise a communication service device, the communication service device supports audio and/or video calls and supports calls with a public network communication device in a public telecommunication network, and the converged communication device is further configured to:

in response to the public network communication device initiating a first calling request to the communication service device, obtain a first number of digits for a public network number in a first number system of the public telecommunication network, and a second number of digits for a local area network number in a second number system of a mine communication network; and convert a calling public network number and/or a called public network number included in the first calling request in the first number system to a calling local area network number and a called local area network number in the second number system based on the first number of digits and the second number of digits, wherein the first number of digits of the public network number in the first number system of the public telecommunication network is different from the second number of digits of the local area network number in the second number system of the mine communication network.

11. The system of claim 10, wherein converting the calling public network number and/or the called public network number included in the first calling request in the first number system to the calling local area network number and the called local area network number in the second number system based on the first number of digits and the second number of digits, comprises:

in response to the first number of digits being less than the second number of digits, filling in digits of the calling public network number and/or the called public network number of the first number of digits in the first number system, until a number of digits of the calling public network number and/or the called public network number after the filling in are the same as the second number of digits;

obtaining a calling transfer number corresponding to the calling public network number after the filling in, and determining, based on the calling transfer number, the calling local area network number in the mine communication network corresponding to the calling public network number after the filling in;

obtaining a called transfer number corresponding to the called public network number after the filling in, and determining, based on the called transfer number, the called local area network number in the mine communication network corresponding to the called public network number after the filling in;

in response to the first number of digits being greater than the second number of digits, obtaining a number capacity in the mine communication network, wherein the second number of digits takes 10 as a base value and a value of the second number of digits as an exponent greater than or equal to the number capacity in the mine communication network;

configuring the calling transfer number corresponding to the calling public network number in the first calling request based on the number capacity, mapping the calling transfer number, and determining a number obtained after the mapping as the calling local area network number in the mine communication network corresponding to the first calling request; and configuring the called transfer number corresponding to the called public network number in the first calling request based on the number capacity, mapping the called transfer number, and determining a number obtained after the mapping as the called local area network number in the mine communication network corresponding to the first calling request;

wherein the converged communication device is further configured to:

search for an address of a called communication service device in the mine communication network based on the calling local area network number and the called local area network number in the mine communication network corresponding to the first calling request, and transfer the first calling request to a communication service device corresponding to the called local area network number.

12. The system of claim 9, wherein the converged communication device is further configured to:

in response to the calling local area network number and/or the called local area network number obtained based on the number conversion rules of the mining communications network being a preconfigured number in the mining communication network, determine that the first calling request is transferred successfully; and in response to the calling local area network number and/or the called local area network number obtained based on the number conversion rules of the mine communication network not being the preconfigured number in the mine communication network, determine that transfer of the first calling request is failed.

13. The system of claim 9, wherein the plurality of service devices comprise a communication service device, the communication service device supports audio and/or video calls and supports calls with a public network communication device in a public telecommunication network, and the converged communication device is further configured to:

in response to the communication service device as a calling communication service device initiating a second calling request to a called communication service device of other communication service devices in the mine communication network, obtain a communication state of the called communication service device in the mine communication network;

in response to the communication state of the called communication service device in the mine communication network being online, transfer the second calling request to the called communication service device;

in response to the communication state of the called communication service device in the mine communication network being offline, determine whether the called communication service device is covered by the public telecommunication network;

in response to the called communication service device being covered by the public telecommunication network, transfer the second calling request to the called communication service device covered by the public telecommunication network; and in response to the communication state of the called communication service device in the mine communication network being offline, and the called communication service device not being covered by the public telecommunication network, determine that calling of the second calling request initiated by the calling communication service device is failed.

14. The system of claim 13, wherein the plurality of service devices comprise the communication service device, the communication service device supports the audio and/or video calls and supports the calls with the public network communication device in the public telecommunication network, and the converged communication device is further configured to:

in response to the called communication service device, acting as a calling communication service device, sending a third calling request to a called public network communication device in the public telecommunication network, obtain a communication state and registration information of the called public network communication device in the mine communication network; and in response to acquisition of the communication state being abnormal and the registration information being abnormal, invalidate the third calling request.

15. The system of claim 1, further comprising a schedule and display device, the converged communication device is further configured to receive location information and/or monitoring screen information returned by a mine service device set under the mine in the plurality of service devices, and send the location information and/or monitoring screen information to the schedule and display device;

the schedule and display device is configured to receive and display the location information and/or monitoring screen information, obtained and sent by the converged communication device;

the converged communication device is further configured to:

in response to the mine service device moving to a coverage range of a monitoring service device set under the mine in the plurality of service devices, associate the mine service device with the monitoring service device;

receive location information of the mine service device from the monitoring service device, and retrieve a monitoring screen of the mine service device captured by the monitoring service device;

in response to the mine service device moving outside of the coverage range of the monitoring service device, disconnect an association between the mine service device and the monitoring service device; and stop receiving the location information of the mine service device from the monitoring service device, and stop retrieving the monitoring screen of the mine service device captured by the monitoring service device.

16. The system of claim 15, wherein the converged communication device is further configured to:
in response to the mine service device moving to an alarm area, receive location information sent by the mine service device in the alarm area;
start monitoring the alarm area, and send monitoring screen information of the alarm area to the schedule and display device; and
obtain alarm information displayed on the schedule and display device, send the alarm information to the mine service device within the alarm area until the mine service device moves outside of the alarm area, stop monitoring the alarm area, and stop sending the alarm information.

17. The system of claim 1, wherein at least one service device of the plurality of service devices, comprises:
at least one of: a long term evolution (LTE) communication device, a fifth generation mobile communication technology (5G) new radio (NR) communication device, a wireless fidelity (WI-FI) communication device, a positioning device, a broadcasting device, a geographic information system (GIS) device, a scheduling device, a video monitoring device, a security monitoring device, and a sixth generation mobile communication technology (6G) communication device.

18. A communication method, comprising:
receiving a first data packet from a first service device that initiates a service request in a plurality of service devices; and
determining a first target service device that receives the service request in the plurality of service devices based on the first data packet, and sending the first data packet to the first target service device, wherein;
the first service device in the plurality of service devices comprises any service device set on or under a mine, and the first target service device comprises at least one service device set on and/or under the mine; and
the plurality of service devices comprise a communication service device, the communication service device supports audio and/or video calls and supports calls with a public network communication device in a public telecommunication network, and the method further comprises;
in response to the public network communication device initiating a first calling request to the communication service device, obtaining a first public network number corresponding to a called communication service device of the first calling request in the public telecommunication network;
determining, from a list of transfer numbers corresponding to number conversion rules of a mine communication network, a first transfer number corresponding to the first public network number, wherein the first transfer number comprises any number in the list of transfer numbers that is not occupied;
determining, based on the first transfer number, a first local area network number corresponding to the called communication service device in the mine communication network, and determining the first local area network number as a called local area network number of the first calling request in the mine communication network; and
transferring the first calling request to a communication service device corresponding to the first local area network number.

19. An electronic device, comprising:
a processor; and
a memory for storing instructions executable by the processor; wherein
the processor is configured to:
receive a first data packet from a first service device that initiates a service request in a plurality of service devices;
determine a first target service device that receives the service request in the plurality of service devices based on the first data packet, and send the first data packet to the first target service device, wherein;
the first service device in the plurality of service devices comprises any service device set on or under a mine, and the first target service device comprises at least one service device set on and/or under the mine; and
the plurality of service devices comprise a communication service device, the communication service device supports audio and/or video calls and supports calls with a public network communication device in a public telecommunication network, and the processor is further configured to;
in response to the public network communication device initiating a first calling request to the communication service device, obtain a first public network number corresponding to a called communication service device of the first calling request in the public telecommunication network;
determine, from a list of transfer numbers corresponding to number conversion rules of a mine communication network, a first transfer number corresponding to the first public network number, wherein the first transfer number comprises any number in the list of transfer numbers that is not occupied;
determine, based on the first transfer number, a first local area network number corresponding to the called communication service device in the mine communication network, and determine the first local area network number as a called local area network number of the first calling request in the mine communication network; and
transfer the first calling request to a communication service device corresponding to the first local area network number.

* * * * *